US009507463B2

(12) United States Patent
Yang et al.

(10) Patent No.: US 9,507,463 B2
(45) Date of Patent: Nov. 29, 2016

(54) IN-CELL TOUCH SCREEN PANEL AND DISPLAY DEVICE

(71) Applicants:BOE TECHNOLOGY GROUP CO., LTD., Beijing (CN); HEFEI BOE OPTOELECTRONICS TECHNOLOGY CO., LTD., Hefei, Anhui (CN)

(72) Inventors: Tong Yang, Beijing (CN); Yubo Xu, Beijing (CN); Ming Hu, Beijing (CN); Byung Cheon Lim, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 60 days.

(21) Appl. No.: 14/368,419

(22) PCT Filed: May 30, 2013

(86) PCT No.: PCT/CN2013/076492
§ 371 (c)(1),
(2) Date: Jun. 24, 2014

(87) PCT Pub. No.: WO2014/153829
PCT Pub. Date: Oct. 2, 2014

(65) Prior Publication Data
US 2015/0205440 A1    Jul. 23, 2015

(30) Foreign Application Priority Data
Mar. 29, 2013 (CN) .......................... 2013 1 0108201

(51) Int. Cl.
*G06F 3/045* (2006.01)
*G06F 3/042* (2006.01)
(Continued)

(52) U.S. Cl.
CPC ............. *G06F 3/0421* (2013.01); *G06F 3/044* (2013.01); *G06F 3/0412* (2013.01); *G06F 2203/04106* (2013.01); *G06F 2203/04112* (2013.01)

(58) Field of Classification Search
CPC ...... G06F 3/041; G06F 3/0416; G06F 3/044; G06F 2203/04112; G02F 1/13338; H01J 40/04
See application file for complete search history.

(56) References Cited

U.S. PATENT DOCUMENTS

2006/0077186 A1* 4/2006 Park .................... G06F 3/0412
345/173
2006/0138983 A1* 6/2006 Lee ..................... G06F 3/0414
349/56
(Continued)

FOREIGN PATENT DOCUMENTS

CN   100535844 C   9/2009
CN   101587400 A   11/2009
(Continued)

OTHER PUBLICATIONS

International Search Report Appln. No. PCT/CN2013/076492; Dated Jan. 2, 2014.
(Continued)

*Primary Examiner* — Joe H Cheng
(74) *Attorney, Agent, or Firm* — Ladas & Parry LLP

(57) ABSTRACT

Embodiments of the present invention disclose an in-cell touch screen panel and a display device, at least one gate signal lines is used as a touch scanning line, a touch readout line is disposed between adjacent columns of pixel units in the array substrate, and a touch unit is disposed in a region defined by the touch scanning line and the touch readout line; each touch unit includes a light sensing sub-unit, a touch electrode and a touch signal control sub-unit; the light sensing sub-unit is connected with the touch signal control sub-unit through the touch electrode, and the control signal output from the light sensing sub-unit varies with the variation of external light and coupling capacitance of the touch electrode; the touch signal control sub-unit is connected with the touch scanning line and the touch readout line respectively, the touch signal control sub-unit outputs the touch sensing signal modulated by the control signal through the touch readout line upon the touch scanning line transferring electrical signals. Compared with a single mode capacitive touch screen panel, the in-cell touch screen panel disclosed in embodiments of the present invention can improve the touch sensitivity of the touch screen panel.

20 Claims, 5 Drawing Sheets

(51) Int. Cl.
    *G06F 3/044* (2006.01)
    *G06F 3/041* (2006.01)

(56) References Cited

U.S. PATENT DOCUMENTS

| | | | |
|---|---|---|---|
| 2006/0146038 A1* | 7/2006 | Park | G06F 3/0412 345/173 |
| 2007/0070047 A1* | 3/2007 | Jeon | G06F 3/0412 345/173 |
| 2007/0176905 A1* | 8/2007 | Shih | G02F 1/13338 345/173 |
| 2009/0033850 A1* | 2/2009 | Ishiguro | G02F 1/13338 349/116 |
| 2009/0115741 A1* | 5/2009 | Wang | G06F 3/044 345/173 |
| 2010/0039406 A1 | 2/2010 | Lee et al. | |
| 2010/0097334 A1 | 4/2010 | Choi et al. | |
| 2010/0097350 A1* | 4/2010 | Choi | G06F 3/042 345/175 |
| 2010/0156819 A1* | 6/2010 | Takahashi | G06F 3/044 345/173 |
| 2010/0164903 A1* | 7/2010 | Lee | G06F 3/0412 345/174 |
| 2011/0018840 A1* | 1/2011 | Fann | G06F 3/0412 345/174 |
| 2011/0063243 A1* | 3/2011 | Kim | G06F 3/0412 345/174 |
| 2012/0056835 A1* | 3/2012 | Choo | G06F 3/0412 345/173 |
| 2013/0100077 A1 | 4/2013 | Chung et al. | |
| 2015/0002432 A1* | 1/2015 | Tan | G09G 3/3258 345/173 |
| 2015/0242040 A1* | 8/2015 | Gu | G09G 3/20 345/175 |

FOREIGN PATENT DOCUMENTS

| | | |
|---|---|---|
| CN | 102495699 A | 6/2012 |
| CN | 203217515 U | 9/2013 |

OTHER PUBLICATIONS

First Chinese Office Action Appln. No. 201310108201.9; Dated Jun. 3, 2015.

Second Chinese Office Action dated Dec. 22, 2015; Appln. No. 201310108201.9.

International Preliminary Report on Patentability Appln. No. PCT/CN2013/076492; Dated Sep. 29, 2015.

Third Chinese Office Action dated May 25, 2016; Appln. No. 201310108201.9.

\* cited by examiner

IN-CELL TOUCH SCREEN PANEL AND DISPLAY DEVICE

TECHNICAL FIELD

Embodiments of the present invention relate to an in-cell touch screen panel and a display device.

BACKGROUND

With the rapid development of display technology, touch screen panels have become popular in people's life. At present, according to the principle of operation, touch screen panels can be classified into: resistive type, capacitive type, infrared type, surface acoustic wave type, electromagnetic type, vibrating wave inductive type, suppressed total internal reflection optical inductive type, and so on. The composition structure of a touch screen panel can be classified into: touch sensor add-on type (double layer), touch sensor on cover surface (single layer), touch sensor on panel, and touch sensor in panel (embedded type). Among them, the structure of touch sensor in a panel can both reduce the overall thickness of the touch screen panel and greatly reduce manufacturing costs of the touch screen panel, hence wining good graces of panel manufacturers.

At present, the design of touch sensor in a panel is mainly realized in the resistive type, the capacitive type, the optical type or the like sensing mode. Among them, resistive sensing technology belongs to the low end sensing technologies resulting in products with a short life. Capacitive sensing technology is mainly suitable for medium and small sizes, namely the touch screen panels of 10 inches or below. While optical sensing technology is not limited in size, obtains products which have a long life and are relatively stable. However, optical type touch screen panels depend on light environment and can not realize touch operation without light.

SUMMARY

One embodiment of the present invention provides an in-cell touch screen panel and a display device for realizing touch screen panels with high touch sensitivity.

One embodiment of the present invention provides an in-cell touch screen panel comprising an array substrate having a plurality of gate signal lines and a plurality of pixel units arranged in a matrix; at least one gate signal line of the array substrate is used as a touch scanning line; the array substrate has a touch readout line between adjacent columns of pixel units;

the array substrate has a touch unit located in a region defined by the touch scanning line and the touch readout line; each touch unit comprises a light sensing sub-unit, a touch electrode and a touch signal control sub-unit; the light sensing sub-unit is connected with the touch signal control sub-unit through the touch electrode, a control signal output by the light sensing sub-unit to the touch signal control sub-unit varies with variation of external light and coupling capacitance of the touch electrode; the touch signal control sub-unit is connected with the touch scanning line and the touch readout line respectively, the touch signal control sub-unit outputs touch sensing signals modulated by the control signal through the touch readout line upon the touch scanning line transferring electrical signals.

One embodiment of the present invention provides a display device comprising the in-cell touch screen panel provided in the embodiment of the present invention.

Embodiments of the present invention provide an in-cell touch screen panel and a display device, in which at least one gate signal line of the array substrate is used as a touch scanning line, a touch readout line is disposed between adjacent columns of pixel units in the array substrate, and a touch unit is disposed in a region defined by the touch scanning line and the touch readout line; each touch unit includes a light sensing sub-unit, a touch electrode and a touch signal control sub-unit; the light sensing sub-unit is connected with the touch signal control sub-unit through the touch electrode, and the control signal output from the light sensing sub-unit varies with the variation of external light and coupling capacitance of the touch electrode; the touch signal control sub-unit is connected with the touch scanning line and the touch readout line respectively, the touch signal control sub-unit outputs the touch sensing signal modulated by the control signal through the touch readout line upon the touch scanning line transferring electrical signals. Since the control signal of the modulated touch sensing signal varies with variation of external light and the coupling capacitance of the touch electrode, the in-cell touch screen panel according to the embodiment of the present invention can improve the touch sensitivity of the touch screen panel in case there is environmental light compared with a single mode capacitive touch screen panel. The in-cell touch screen panel according to the embodiment of the present invention can also realize touch operation in case there is no environmental light compared with a single mode optical sensing touch screen panel, hence reducing dependence of the touch screen panel on the light environment.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 4 is a circuit timing diagram corresponding to the circuit diagram illustrated in FIG. 3a.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. Specific implementations of the in-cell touch screen panel and the display device provided in embodiments of the present invention will be described in detail below with reference to accompanying drawings.

Figure 1:
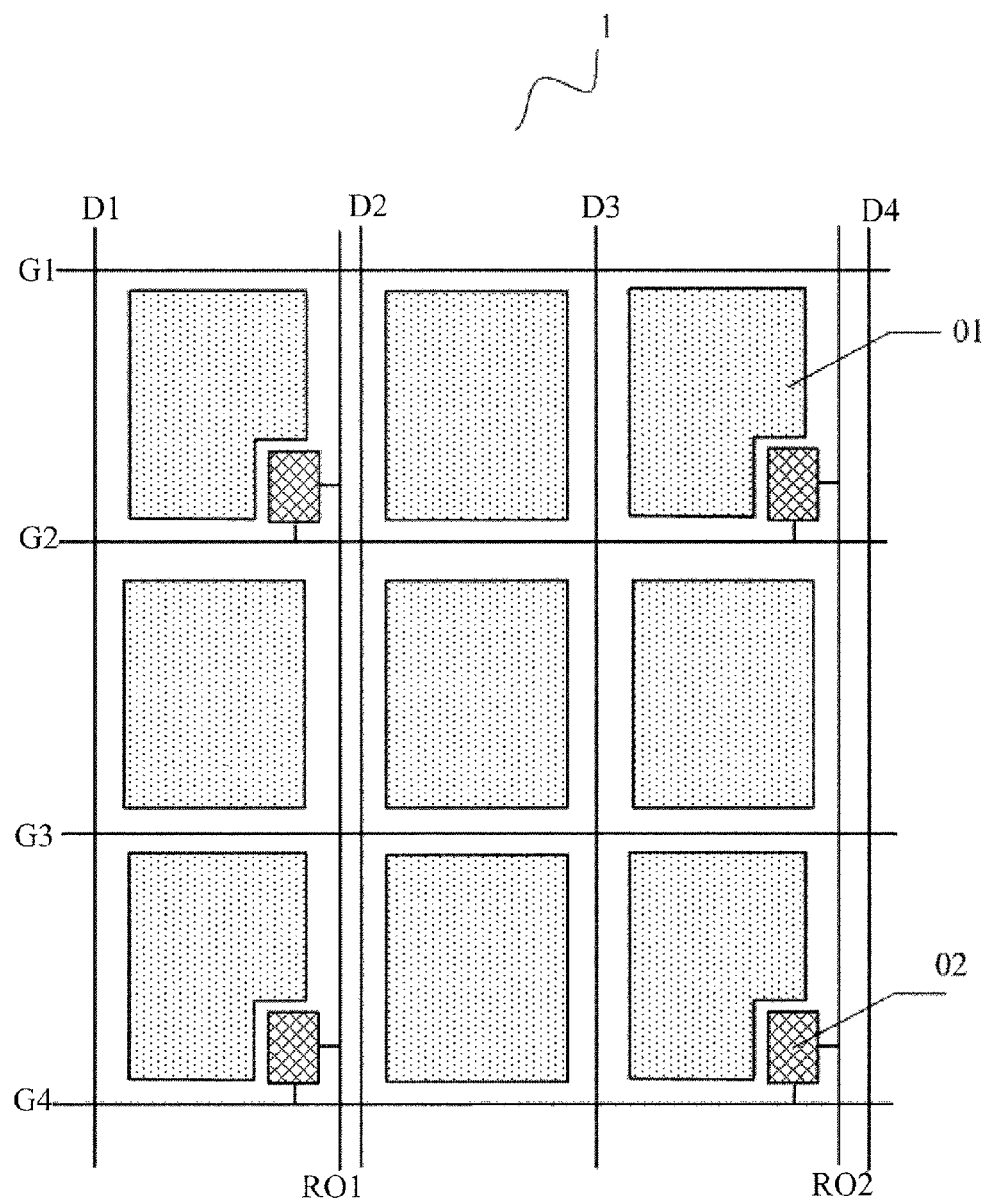
FIG. 1 is a structural representation of an in-cell touch screen panel provided in an embodiment of the present invention.

An in-cell touch screen panel provided in an embodiment of the present invention includes: an array substrate 1 having gate signal lines GN (N=1, 2, 3 . . . ) (FIG. 1 shows only an example of N=4, and one skilled in the art can understand this is not a limitation to the present invention but for making accompanying drawings simple and clear) and a plurality of pixel units 01 arranged in a matrix disposed on the array substrate 1, as illustrated in FIG. 1; DN (N=1, 2, 3 . . . ) denotes data signal lines on the array substrate (FIG. 1 shows only an example of N=4, and one skilled in the art can understand this is not a limitation to the present invention but for making accompanying drawings simple and clear).

At least one gate signal line GN in the array substrate 1 functions as a touch scanning line (for example, G2 and G4 in FIG. 1 function as the touch scanning lines).

The array substrate 1 has touch reading lines RO N (Read outN) (N=1, 2, 3 . . . ) located between adjacent columns' of pixel units 01; FIG. 1 shows only an example of N=2, and one skilled in the art can understand this is not limitation to the present invention but for making accompanying drawings simple and clear.

The array substrate 1 has touch units 02 (FIG. 1 does not show specific structure of the touch unit) in regions defined by touch scanning lines G2 and G4 and touch readout lines RO1 (Read out 1) and RO2 (Read out 2).

Each touch unit includes a light sensing sub-unit, a touch electrode and a touch signal control sub-unit. The light sensing sub-unit is connected with the touch signal control sub-unit through the touch electrode. The control signal output from the light sensing sub-unit to the touch signal control sub-unit varies with the variation of external light and the coupling capacitance of the touch electrode. The touch signal control sub-unit is connected with a touch scanning line and a touch readout line respectively. The touch signal control sub-unit outputs the touch sensing signals, which are modulated by the control signal, through the touch readout line upon the touch scanning line transferring electrical signals.

Figure 2:
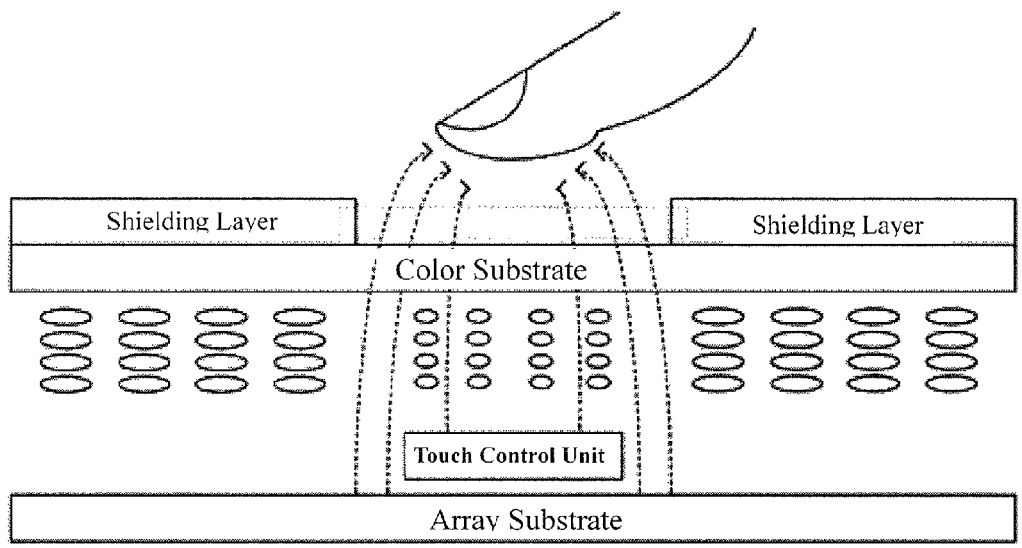
FIG. 2 is a structural representation of an in-cell touch screen panel provided in an embodiment of the present invention.

Furthermore, as illustrated in FIG. 2, in the above-mentioned touch screen panel provided in one embodiment of the present invention, there is generally a shielding layer for shielding electric field on the color filter substrate disposed oppositely to the array substrate. The shielding layer comprises opening areas in at least regions corresponding to the touch units, that is, comprises no patterns in regions of the shielding layer corresponding to the touch units. Regions without pattern are illustrated by dotted line boxes in FIG. 2. Of course, it is also possible to arrange opening areas in other regions in the shielding layer if required, which is not limited here. External light can irradiate light sensing sub-units in touch units through the opening areas, and a finger can form capacitors with touch electrodes via the opening areas.

In general, touch precision of a touch screen panel is generally in order of millimeter, while display precision of the array substrate is generally in order of micron. As can be seen, the touch screen panel needs much less touch scanning lines and touch readout lines than the driving lines (data signal lines and gate signal lines) that the array substrate needs for display. Therefore, in the touch screen panel provided in one embodiment of the present invention, in setting touch readout lines and touch scanning lines, it is generally possible to set spacing between touch scanning lines to be equal, and to set spacing between touch readout lines to be equal.

For example, it is possible to set the spacing between touch scanning lines and the spacing between touch readout lines to be equal so as to unify the touch precision of a touch screen panel.

Furthermore, when touch readout lines between adjacent columns of pixel units in the array substrate are implemented, it is possible to dispose touch readout lines and data signal lines that are in the array substrate in the same layer and insulated from each other, that is, the data signal lines are manufactured along with the touch readout lines insulated from them. In this way, no additional manufacturing process is needed while manufacturing the array substrate, only one patterning process is needed to form the patterns of both data signal lines and touch readout lines, thereby saving manufacturing costs and improving products' added value. Of course, it is also possible to manufacture touch readout lines and data signal lines separately, which is not limited herein.

Particularly, with the above-mentioned touch screen panel provided in one embodiment of the present invention, where touch units in regions defined by the touch scanning lines and the touch readout lines are arranged, metal or transparent conducting oxide may be used as the material for touch electrodes.

In addition, the touch electrodes may be identical with pixel electrodes or common electrode in material in the array substrate, manufactured in the same layer, and be ensured to be insulated from each other. The touch units may also be of the same material for the source and drain electrodes of the transistor devices in the array substrate, manufactured in the same layer, and be ensured to be insulated from each other, which is not described in detail here.

Since touch units are each disposed only in the regions defined by touch scanning lines and touch readout lines, in order to ensure aperture ratio of the touch screen panel, the touch sensing area of each touch unit will be set small, which is inadvantegous to improve touch sensitivity. Therefore, preferably, the touch screen panel provided in an embodiment of the present invention may further include: at least one touch sub-electrode electrically connected with the touch electrode and located in gaps between adjacent pixel units. In this way, it is possible to increase touch area of each touch unit as best as one can while ensuring the aperture ratio of the touch screen panel to improve the sensitivity of touch sensing.

With the above-mentioned in-cell touch screen panel provided in one embodiment of the present invention, each touch unit disposed in the array substrate includes a light sensing sub-unit, a touch electrode and a touch signal control sub-unit. The control signal output by the light sensing sub-unit is input into the touch signal control sub-unit through the touch electrode. The control signal will vary with the variation of external light and the coupling capacitance of the touch electrode. Particularly, no matter there is any or no external light, the control signal when no touch occurs is smaller than that when any touch occurs. Further, when there is no touch, the control signal when there is external light irradiation is smaller than that when there is no external light irradiation. In addition, the larger the control signal input into the touch control sub-unit is, the larger the touch sensing signal output to the touch readout line by the touch signal control sub-unit. Therefore, compared to a single mode capacitive touch screen panel, the touch screen panel according to one embodiment of the present invention can improve touch sensitivity of the touch screen panel in case of external light being present. Also, compared to a single optical sensing touch screen panel, in case of no external light irradiation, the touch screen panel according to one embodiment of the present invention can also implement touch operation, reducing touch screen panel's dependence on light environment.

Particularly, the light sensing sub-unit included in each touch unit in the above-mentioned touch screen panel provided in an embodiment of the present invention may be a light sensing transistor. The operation principle of such a photosensitive transistor is as follows: without external light irradiation, if a certain positive voltage is applied on the gate electrode of the photosensitive transistor, density of carriers in the active layer of the photosensitive transistor will increase, the photosensitive transistor is in ON state, and if there is a voltage difference between the source and drain electrodes of the photosensitive transistor, a current is generated between the source and the drain; if a certain negative voltage is applied at the gate electrode of the photosensitive transistor, the density of carriers in the active layer of the photosensitive transistor will decrease, the photosensitive transistor is in OFF state, and no current will be generated regardless of voltage difference between the source and drain electrodes of the photosensitive transistor.

While in case of external light irradiation, even if a certain negative voltage is applied at the gate electrode of the photosensitive transistor, partial electrons in the active layer of the photosensitive transistor will be excited by photons to jump from a valence band to a conduction band, forming carriers, thereby increasing density of carriers in the active layer, and if there is a voltage difference between the source and drain electrodes of the photosensitive transistor, a current is generated between the source and the drain.

The specific structure of the touch unit 02 disposed in the array substrate of the above-mentioned touch screen panel provided in an embodiment of the present invention will be described in detail below with reference to specific examples. The touch unit 02 includes a light sensing sub-unit 03, a touch electrode 04 and a touch signal control sub-unit 05.

In one embodiment, a plurality of photosensitive scanning lines and a plurality of photosensitive signal lines are provided between adjacent pixel units of an array substrate on the array substrate. Photosensitive scanning lines and photosensitive signal lines may be disposed in gaps between adjacent lines of pixel units. Also, in order to simplify wiring on the array substrate, it is possible to specifically set the photosensitive scanning line as at least one gate signal line different from the touch scanning line in the array substrate. For example, G1 and G2 are two adjacent gate signal lines in FIG. 3a. It is possible to use G2 as a touch scanning line, use the preceding line G1 of G2 as a photosensitive scanning line and use the line Pre (precharge) as a photosensitive signal line. Of course, it is also possible to use the next line G3 of G2 as the photosensitive scanning line, which is not limited here.

Figure 3A:
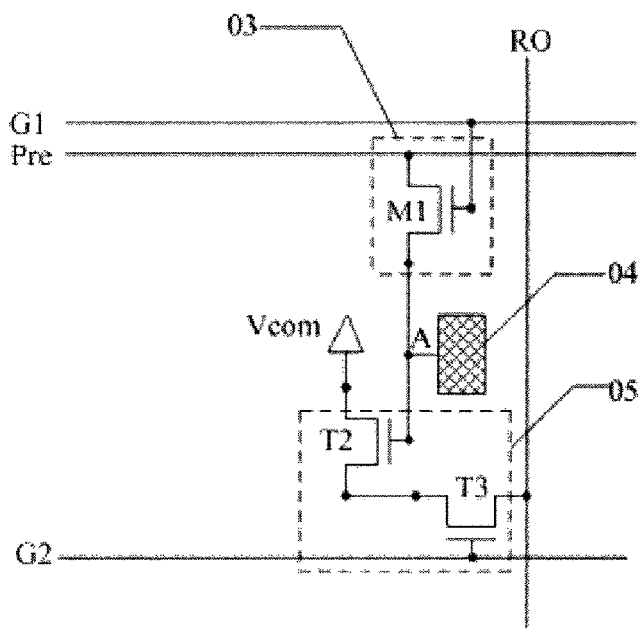
FIGS. 3a to 3c are specific schematic diagrams of a touch unit provided in an embodiment of the present invention.

Furthermore, as illustrated in FIG. 3a, the light sensing sub-unit 03 includes a photosensitive transistor M1. The gate electrode of the photosensitive transistor M1 is connected with the photosensitive scanning line G1, the source electrode of the photosensitive transistor M1 is connected with the photosensitive signal line Pre, and the drain electrode of the photosensitive transistor M1 is connected with the touch electrode 04, namely node A in FIG. 3a. The photosensitive signal line Pre transfers control signal to the touch electrode 04 when the photosensitive transistor M1 is turned on.

In another embodiment, a plurality of photosensitive scanning lines are provided between adjacent pixel units of an array substrate on the array substrate. Photosensitive scanning lines may be disposed in gaps between adjacent lines of pixel units. Also, in order to simplify wiring on the array substrate, it is possible to specifically set the photosensitive scanning line as at least one gate signal line different from the touch scanning line in the array substrate. For example, G1 and G2 are two adjacent gate signal lines in FIG. 3b. It is possible to use G2 as a touch scanning line, and use the preceding line G1 of G2 as a photosensitive scanning line. Of course, it is also possible to use the next line G3 of G2 as a photosensitive scanning line, which is not limited here.

Figure 3B:
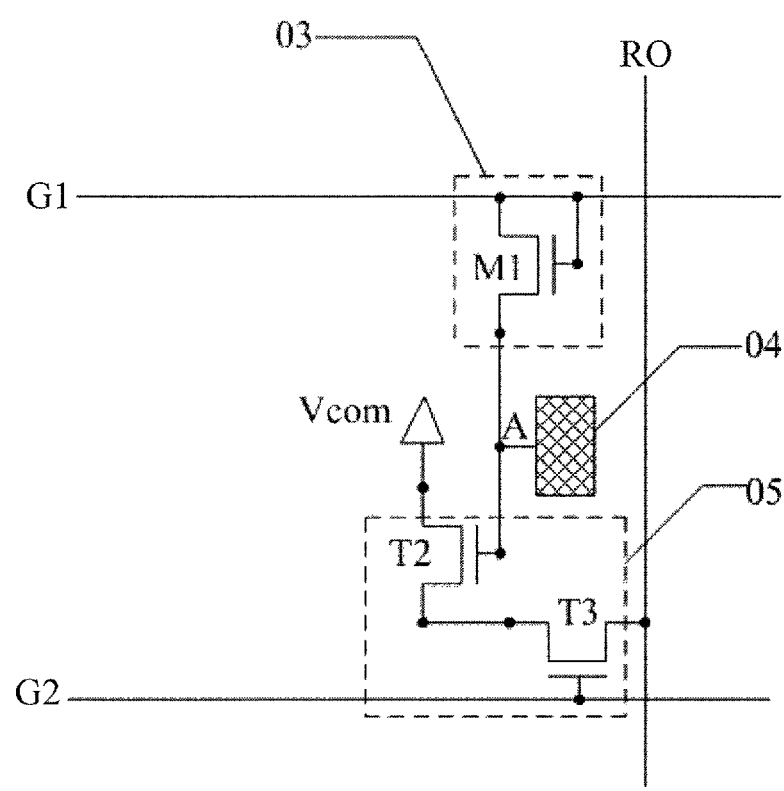

As illustrated in FIG. 3b, the light sensing sub-unit 03 includes a photosensitive transistor M1. The gate and source electrodes of the photosensitive transistor M1 are connected with the photosensitive scanning line G1, and the drain electrode of the photosensitive transistor M1 is connected with the touch electrode 04, namely node A in FIG. 3b.

In yet another embodiment, a plurality of photosensitive scanning lines are provided between adjacent pixel units of an array substrate on the array substrate. Photosensitive scanning lines may be disposed in gaps between adjacent lines of pixel units. Also, in order to simplify wiring on the array substrate, it is possible to specifically set the photosensitive scanning line as at least one gate signal line different from the touch scanning line in the array substrate. For example, G1 and G2 are two adjacent gate signal lines in FIG. 3c. It is possible to use G2 as a touch scanning line, and use the preceding line G1 of G2 as a photosensitive scanning line. Of course, it is also possible to use the next line G3 of G2 as the photosensitive scanning line, which is not limited here.

Figure 3C:
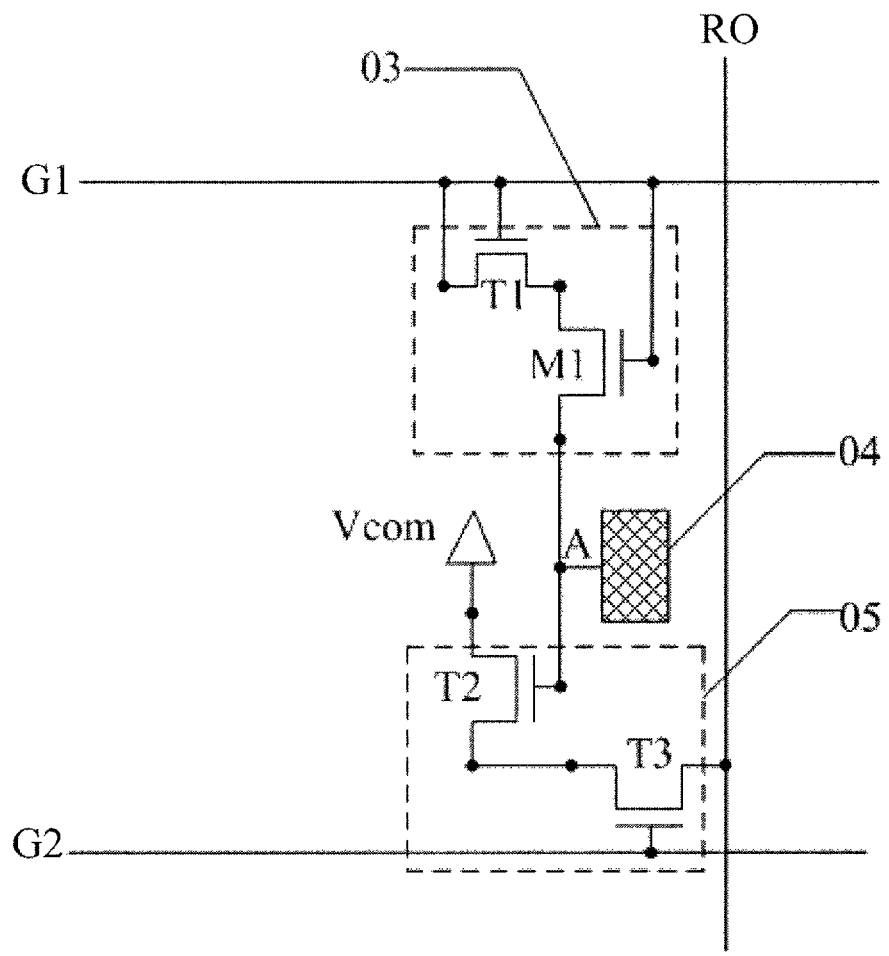

As illustrated in FIG. 3c, the light sensing sub-unit 03 includes a photosensitive transistor M1 and a first transistor T1. The gate electrode of the photosensitive transistor M1 is connected with the photosensitive scanning line G1, the drain electrode of the photosensitive transistor M1 is connected with the touch electrode 04, namely node A in FIG. 3c, and the source electrode of the photosensitive transistor M1 is connected with the drain electrode of the first transistor T1. The source and the gate electrodes of the first transistor T1 are connected with the photosensitive scanning line G1. In specific implementations, it is possible to adjust the voltage input into the source electrode of the photosensitive transistor M1 by adjusting the aspect ratio of the first transistor T1.

Particularly, as illustrated in FIGS. 3a-3c, the touch signal control sub-unit 05 included in each touch unit in the above-mentioned touch screen panel provided in the above-mentioned embodiments of the present invention may specifically include a second transistor T2 and a third transistor T3.

The gate electrode of the second transistor T2 is connected with the touch electrode 04, the source electrode of the second transistor T2 is connected with the constant voltage signal line or the common electrode Vcom, and the drain electrode of the second transistor T2 is connected with the source electrode of the third transistor T3. The drain electrode of the third transistor T3 is connected with the touch readout line RO (Read out), the gate electrode of the third transistor T3 is connected with the touch scanning line G2; here the voltage on the constant voltage signal line is constant.

It is to be noted that the common electrode Vcom connected with the source electrode of the second transistor T2 may be the transparent common electrode facing the pixel electrode, and may also be the common electrode line made of a metal material, which is not limited here.

When the touch electrode 04 connected with the gate electrode of the second transistor T2 is loading touch signals via the light sensing sub-unit 03, the second transistor T2 is in a linear operation state. The larger the control signal of the gate electrode of the second transistor T2 is, the larger the current flowing from the common electrode Vcom through the source and the drain electrode of the second transistor T2, and hence the larger the current flowing to the source electrode of the third transistor T3.

When a high level is applied on the touch scanning line G2 connected with the gate electrode of the third transistor T3, the third transistor T3 is in the ON state completely, and the touch sensing signal of the source electrode of the third transistor T3 is not influenced and directly output to the touch readout line RO connected with the drain electrode of the third transistor T3.

Therefore, it can be known from the above analysis that, the larger the control signal input into the touch signal control sub-unit 05 is, the larger the touch sensing signal output to the touch readout line RO by the touch signal control sub-unit. The control signal varies with the variation of external light and the coupling capacitance of the touch electrode 04, then it is possible to determine whether touch occurs by detecting the magnitude of current on the touch readout line RO.

Figure 4:
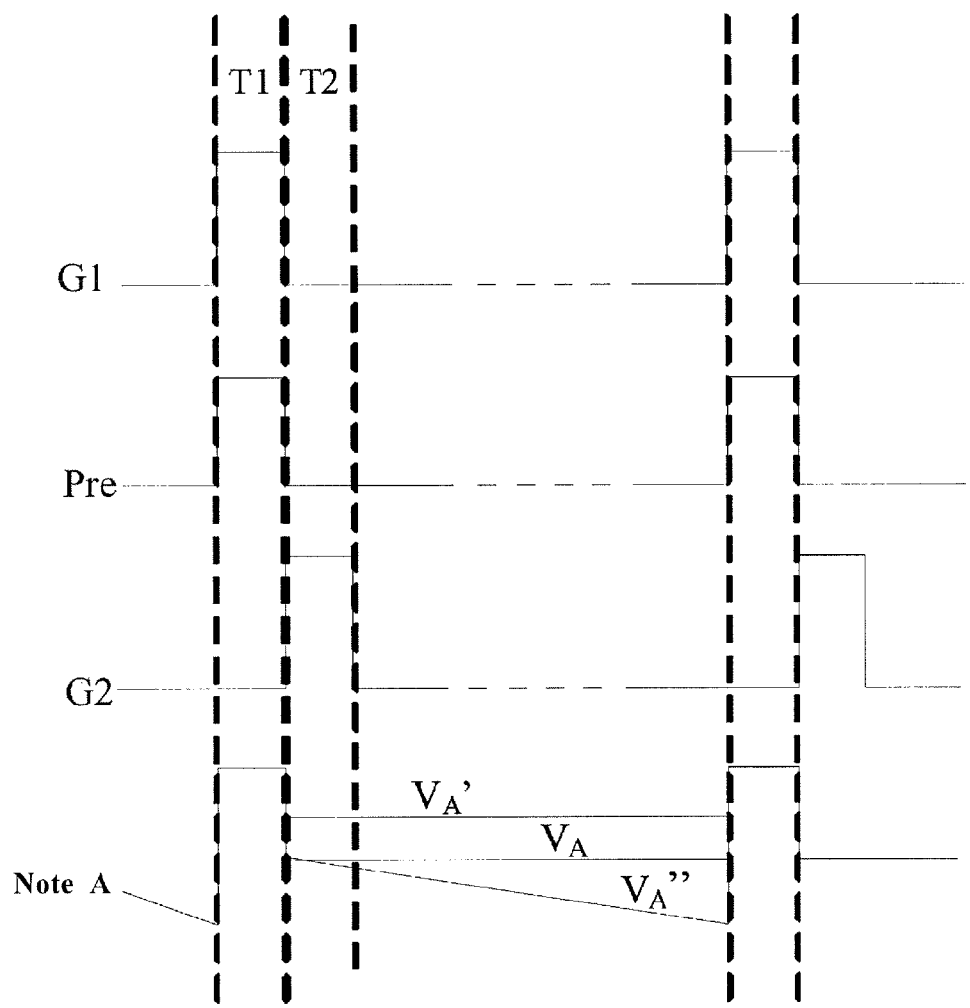

Particular operation principle of the touch screen panel provided in an embodiment of the present invention will be described briefly with the structure as illustrated in FIG. 3a as an example with reference to the timing diagram as illustrated in FIG. 4.

In the first time interval t1, the photosensitive scanning line G1 is at a high level $V_{gh}$, the photosensitive signal line Pre is at a high level $V_{pre}$, the photosensitive transistor M1 is in the ON state, the photosensitive signal line Pre outputs the control signal $V_{pre}$ to node A through the photosensitive transistor M1, and the potential of node A is $V_A=V_{pre}$.

In the second time interval t2, the photosensitive scanning line G1 and the photosensitive signal line Pre turn into low level $V_{gl}$ at the same time, the touch scanning line G2 turns from low a level $V_{gl}$ to a high level $V_{gh}$, then the gate electrode of the third transistor T3 is at a high level, the gate electrode of the second transistor t2 is controlled by the potential VA at the note A, the second transistor t2 is in a linear operation area, and the third transistor T3 is in the ON state. At this time, the touch sensing signal flows from the common electrode Vcom to the touch readout line RO. The higher the potential VA of the node A is, the larger the touch sensing signal flowing to the touch readout line RO is; contrarily, the smaller the VA, the smaller the touch sensing signal is. At this time, the potential of the node A is classified into the following three cases:

First Case: if there is no external light and no touch, since no external light irradiates the photosensitive transistor M1, carriers in the active layer of the photosensitive transistor M1 can be neglected, and the leakage current flowing from node A to the photosensitive signal line Pre may be neglected. The potential variation of the node A is only influenced by the potentials of the photosensitive scanning line G1 and the touch scanning line G2. At this time the potential of the node A is $V_A=V_{pre}-\Delta V_A$, and further $$\Delta V_A=\Delta V_{A1}+\Delta V_{A2}$$

$$\Delta V_{A1}=C_{gs1}*(V_{gh}-V_{gl})/(C_{gs1}+C_x+C_{gs2})\Delta V_{A2}=C_x*(V_{gl}-V_{gh})/(C_{gs1}+C_x+C_{gs2})$$

$$\Delta V_{A1}+\Delta V_{A2}=(C_{gs1}-C_x)*(V_{gh}-V_{gl})/(C_{gs1}+C_x+C_{gs2}),$$
and $$C_x=C_{gd2}*C_{gs3}/(C_{gd2}+C_{gs3})$$

in which $C_{gs1}$ represents the parasitic capacitance between the gate and source electrodes of the photosensitive transistor M1, $C_{gs2}$ represents the parasitic capacitance between the gate and source electrode of the second transistor T2, $C_{gd2}$ represents the parasitic capacitance between gates and the drain electrode of the second transistor T2, $C_{gs3}$ represents the parasitic capacitance between the gate and source electrodes of the third transistor T3. All the above capacitances may be regarded as coupling capacitances of the touch electrodes.

In practice, since the photosensitive transistor M1 functions as a photosensitive device, its size should be large. While the second transistor T2 and the third transistor T3 still function as control transistors, their sizes should be small in order to reduce influence on aperture ratio. Therefore, $C_x<C_{gs1}$, namely the result of $C_{gs1}-C_x$ is positive, and the result of $\Delta V_{A1}+\Delta V_{A2}$ is positive too, hence $V_A<V_{pre}$.

Second Case: when touch occurs, no matter there is any or no external light irradiation, no external light irradiates the photosensitive transistor M1 due to the blocking of finger. Therefore, the carriers in the active layer of the photosensitive transistor M1 may be neglected, and the leakage current flowing from the node A to the photosensitive signal line Pre may be neglected. However since touch occurs, the finger will generate capacitance $C_t$ with the touch electrode 04, and at this time the potential of the node A is $V_A'=V_{pre}-\Delta V_A'$, where $$\Delta V_A'=\Delta V_{A1}'+\Delta V_{A2}'$$

$$\Delta V_{A1}'=C_{gs1}*(V_{gh}-V_{gl})/(C_{gs1}+C_x+C_{gs2}+C_t),$$

$$\Delta V_{A2}'=C_x*(V_{gl}-V_{gh})/(C_{gs1}+C_x+C_{gs2}+C_t)$$

$$\Delta V_{A1}'+\Delta V_{A2}'=(C_{gs1}-C_x)*(V_{gh}-V_{gl})/(C_{gs1}+C_x+C_{gs2}+C_t),$$
and $$C_x=C_{gd2}*C_{gs3}/(C_{gd2}\pm C_{gs3})$$

in which $C_{gs1}$ represents the parasitic capacitance between the gate and source electrodes of the photosensitive transistor M1, $C_{gs2}$ represents the parasitic capacitance between the gate and source electrodes of the second transistor T2, $C_{gd2}$ represents the parasitic capacitance between the gate and drain electrodes of the second transistor T2, $C_{gs3}$ represents the parasitic capacitance between the gate and drain electrodes of the third transistor T3, and $C_t$ represents the capacitance formed between the finger and the touch electrode 04. All the above kinds of capacitance may be regarded as coupling capacitances of the touch electrodes.

In practice, since the photosensitive transistor M1 functions as a photosensitive device, its size should be large. While the second transistor T2 and the third transistor T3 still function as control transistors, their sizes should be small in order to reduce influence on aperture ratio. Therefore, the result of $C_x<C_{gs1}$, namely $C_{gs1}-C_x$ is positive, and the result of $\Delta V_{A1}'+\Delta V_{A2}'$ is positive, hence $V_A'<V_{pre}$.

As can be seen from comparison, $\Delta V_A'<\Delta V_A$, and therefore $V_A'>V_A$. That is, in case there is no external light, the potential of the node A when a touch occurs is higher than that when no touch occurs, the gate voltage of the second transistor T2 is higher, thereby when a touch occurs, the current of touch sensing signal flowing to the touch readout line RO is larger.

Third Case: in case there is external light and no touch, since external light irradiates the photosensitive transistor M1, carriers are generated in the active layer of the photosensitive transistor M1. At the moment when the potential of the photosensitive scanning line G1 flips (namely from a high potential to a low potential), the potential of the node A $V_A''$ is equal to $V_A$ ($V_A''=V_A$). However as time elapses, the potential of the node A will decrease (since carriers in the photosensitive transistor M1 cause the current flow from the node A at a high potential to the photosensitive signal line Pre at a low potential).

As can be seen from comparison, in the time intervals in which G2 is at a high level, $V_A'>V_A>V_A''$. Therefore, in case there is no external light, the potential of the node A when a touch occurs is higher than that when no touch occurs, the gate voltage of the second transistor T2 is higher, thereby when a touch occurs, the current of the touch sensing signal flowing to the touch readout line RO is larger.

Furthermore, in case there is external light irradiation, compared with the case there is no external light irradiation, the current difference on the touch readout signal line RO is more significant, thus the touch screen panel provided in an embodiment of the present invention has higher touch sensitivity than a single capacitive touch screen panel. In case there is no external light irradiation, when a touch occurs, the current on the touch readout line RO will change also, thereby the touch screen panel provided in embodiments of the present invention reduces dependence on light environment compared to a single mode optical sensing touch screen panel.

Based on the same inventive concept, an embodiment of the present invention further provides a display device including the above-mentioned in-cell touch screen panel provided in an embodiment of the present invention, which display device may be a display, a cellphone, a TV set, a notebook computer, an integrated computer, and the like. Other indispensable components of the display device are all as understood by one of ordinary skill in the art to be provided and are not described any more here, which should not limit the present invention.

Embodiments of the present invention provide an in-cell touch screen panel and a display device; at least one gate signal line of the array substrate is used as a touch scanning line, a touch readout line is disposed between adjacent columns of pixel units on the array substrate, and a touch unit is disposed in a region defined by the touch scanning line and the touch readout line. Each touch unit includes a light sensing sub-unit, a touch electrode and a touch signal control sub-unit. The light sensing sub-unit is connected with the touch signal control sub-unit through the touch electrode, and the control signal output from the light sensing sub-unit varies with the variation of external light and the coupling capacitance of the touch electrode. The touch signal control sub-unit is connected with the touch scanning line and the touch readout line respectively. The touch signal control sub-unit outputs the touch sensing signal modulated by the control signal through the touch readout line upon the touch scanning line transferring electrical signals. Since the control signal of the modulated touch sensing signal varies with variation of external light and the coupling capacitance of touch electrode, the in-cell touch screen panel of the present invention can improve the touch sensitivity of the touch screen panel in case there is environmental light compared with a single mode capacitive touch screen panel. The in-cell touch screen panel of the present invention can also realize touch operation in case there is no environmental light compared to a single mode optical sensing touch screen panel, hence reducing dependence of the touch screen panel on light environment.

It is obvious that those skilled in the art can make various modifications and variations to the present invention without departing from the spirit and scope of the present invention. Thus, if these modifications and variations of the present invention fall within the scope of the claims and equivalents of the present invention, the present invention is intended to encompass these modifications and variations.

The invention claimed is:

1. An in-cell touch screen panel comprising an array substrate having a plurality of gate signal lines and a plurality of pixel units arranged in a matrix; wherein
   at least one gate signal line of the array substrate is used as a touch scanning line;
   the array substrate has a touch readout line between adjacent colunms of pixel units;
   the array substrate has a touch unit located in a region defined by the touch scanning line and the touch readout line;
   the touch unit comprises a light sensing sub-unit, a touch electrode and a touch signal control sub-unit; the light sensing sub-unit is connected with the touch signal control sub-unit through the touch electrode, a control signal output by the light sensing sub-unit to the touch signal control sub-unit varies with variation of external light and coupling capacitance of the touch electrode; the touch signal control sub-unit is connected with the touch scanning line and the touch readout line respectively, the touch signal control sub-unit outputs touch sensing signals modulated by the control signal through the touch readout line upon the touch scanning line transferring electrical signals.

2. The touch screen panel of claim 1, wherein the array substrate has a plurality of photosensitive scanning lines and a plurality of photosensitive signal lines located between adjacent pixel units in the array substrate;
   the light sensing sub-unit comprises a photosensitive transistor; wherein a gate electrode of the photosensitive transistor is connected with one of the photosensitive scanning lines, a source electrode of the photosensitive transistor is connected with one of the photosensitive signal lines, a drain electrode of the photosensitive transistor is connected with the touch electrode, and the photosensitive signal line is configured to transfer the control signal to the touch electrode when the photosensitive transistor is turned on.

3. The touch screen panel of claim 2, wherein the photosensitive scanning lines are gate signal lines different from the touch scanning lines in the array substrate.

4. The touch screen panel of claim 3, wherein the touch signal control sub-unit comprises a second transistor and a third transistor;
a gate electrode of the second transistor is connected with the touch electrode, a source electrode of the second transistor is connected with a constant voltage signal line or a common electrode, a drain electrode of the second transistor is connected with a source electrode of the third transistor, a drain electrode of the third transistor is connected with the touch readout line, and a gate electrode of the third transistor is connected with the touch scanning line.

5. The touch screen panel of claim 3, further comprising: at least one touch sub-electrode electrically connected with the touch electrode and located in a gap between adjacent pixel units.

6. The touch screen panel of claim 2, wherein the touch signal control sub-unit comprises a second transistor and a third transistor;
a gate electrode of the second transistor is connected with the touch electrode, a source electrode of the second transistor is connected with a constant voltage signal line or a common electrode, a drain electrode of the second transistor is connected with a source electrode of the third transistor, a drain electrode of the third transistor is connected with the touch readout line, and a gate electrode of the third transistor is connected with the touch scanning line.

7. The touch screen panel of claim 2, further comprising: at least one touch sub-electrode electrically connected with the touch electrode and located in a gap between adjacent pixel units.

8. The touch screen panel of claim 1, wherein the array substrate has a plurality of photosensitive scanning lines located between adjacent pixel units in the array substrate;
the light sensing sub-unit comprises a photosensitive transistor; wherein a gate electrode and a source electrode of the photosensitive transistor are connected with one of the photosensitive scanning lines, and a drain electrode of the photosensitive transistor is connected with the touch electrode.

9. The touch screen panel of claim 8, wherein the photosensitive scanning lines are gate signal lines different from the touch scanning lines in the array substrate.

10. The touch screen panel of claim 8, wherein the touch signal control sub-unit comprises a second transistor and a third transistor;
a gate electrode of the second transistor is connected with the touch electrode, a source electrode of the second transistor is connected with a constant voltage signal line or a common electrode, a drain electrode of the second transistor is connected with a source electrode of the third transistor, a drain electrode of the third transistor is connected with the touch readout line, and a gate electrode of the third transistor is connected with the touch scanning line.

11. The touch screen panel of claim 8, further comprising: at least one touch sub-electrode electrically connected with the touch electrode and located in a gap between adjacent pixel units.

12. The touch screen panel of claim 1, wherein the array substrate has a plurality of photosensitive scanning lines located between adjacent pixel units in the array substrate;
the light sensing sub-unit comprises a photosensitive transistor and a first transistor; wherein a gate electrode of the photosensitive transistor is connected with one of the photosensitive scanning lines, a drain electrode of the photosensitive transistor is connected with the touch electrode, a source electrode of the photosensitive transistor is connected with a drain electrode of the first transistor; and a source electrode and a gate electrode of the first transistor are connected with the photosensitive scanning line.

13. The touch screen panel of claim 12, wherein the photosensitive scanning lines are gate signal lines different from the touch scanning lines in the array substrate.

14. The touch screen panel of claim 12, wherein the touch signal control sub-unit comprises a second transistor and a third transistor;
a gate electrode of the second transistor is connected with the touch electrode, a source electrode of the second transistor is connected with a constant voltage signal line or a common electrode, a drain electrode of the second transistor is connected with a source electrode of the third transistor, a drain electrode of the third transistor is connected with the touch readout line, and a gate electrode of the third transistor is connected with the touch scanning line.

15. The touch screen panel of claim 12, further comprising: at least one touch sub-electrode electrically connected with the touch electrode and located in a gap between adjacent pixel units.

16. The touch screen panel of claim 1, wherein the touch signal control sub-unit comprises a second transistor and a third transistor;
a gate electrode of the second transistor is connected with the touch electrode, a source electrode of the second transistor is connected with a constant voltage signal line or a common electrode, a drain electrode of the second transistor is connected with a source electrode of the third transistor, a drain electrode of the third transistor is connected with the touch readout line, and a gate electrode of the third transistor is connected with the touch scanning line.

17. The touch screen panel of claim 1, wherein the touch readout lines and data signal lines in the array substrate are disposed in a same layer and insulated from each other.

18. The touch screen panel of claim 1, wherein the touch electrodes and a pixel electrode or common electrode in the array substrate are of a same material, disposed in a same layer, and insulated from each other.

19. The touch screen panel of claim 1, further comprising: at least one touch sub-electrode electrically connected with the touch electrode and located in a gap between adjacent pixel units.

20. A display device comprising the touch screen panel of claim 1.

* * * * *